No. 856,560. PATENTED JUNE 11, 1907.
T. C. WALKER, Jr.
ROTARY DIE MACHINE FOR MAKING SLOTTED SCREENS.
APPLICATION FILED NOV. 14, 1906
2 SHEETS—SHEET 1.
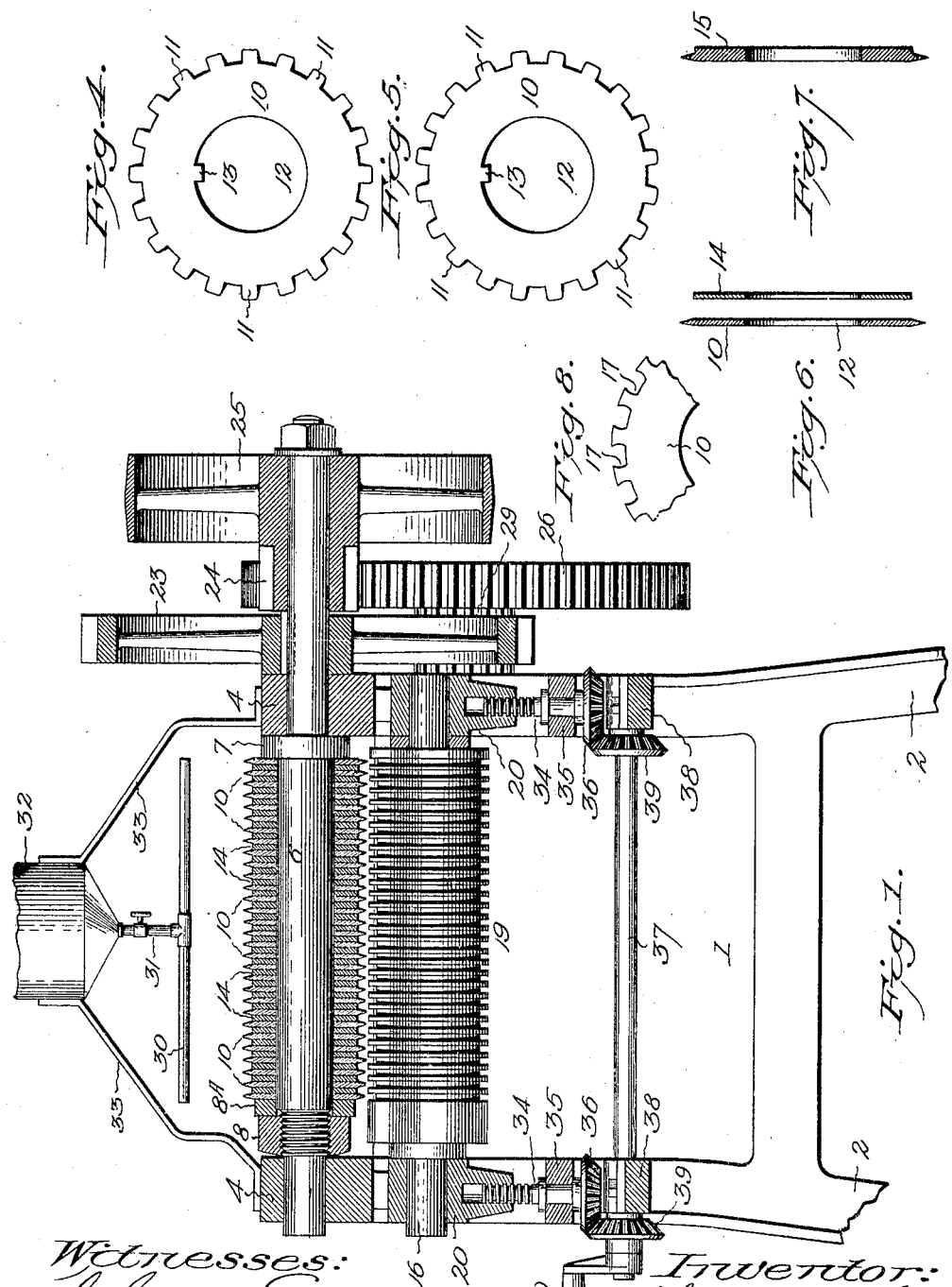

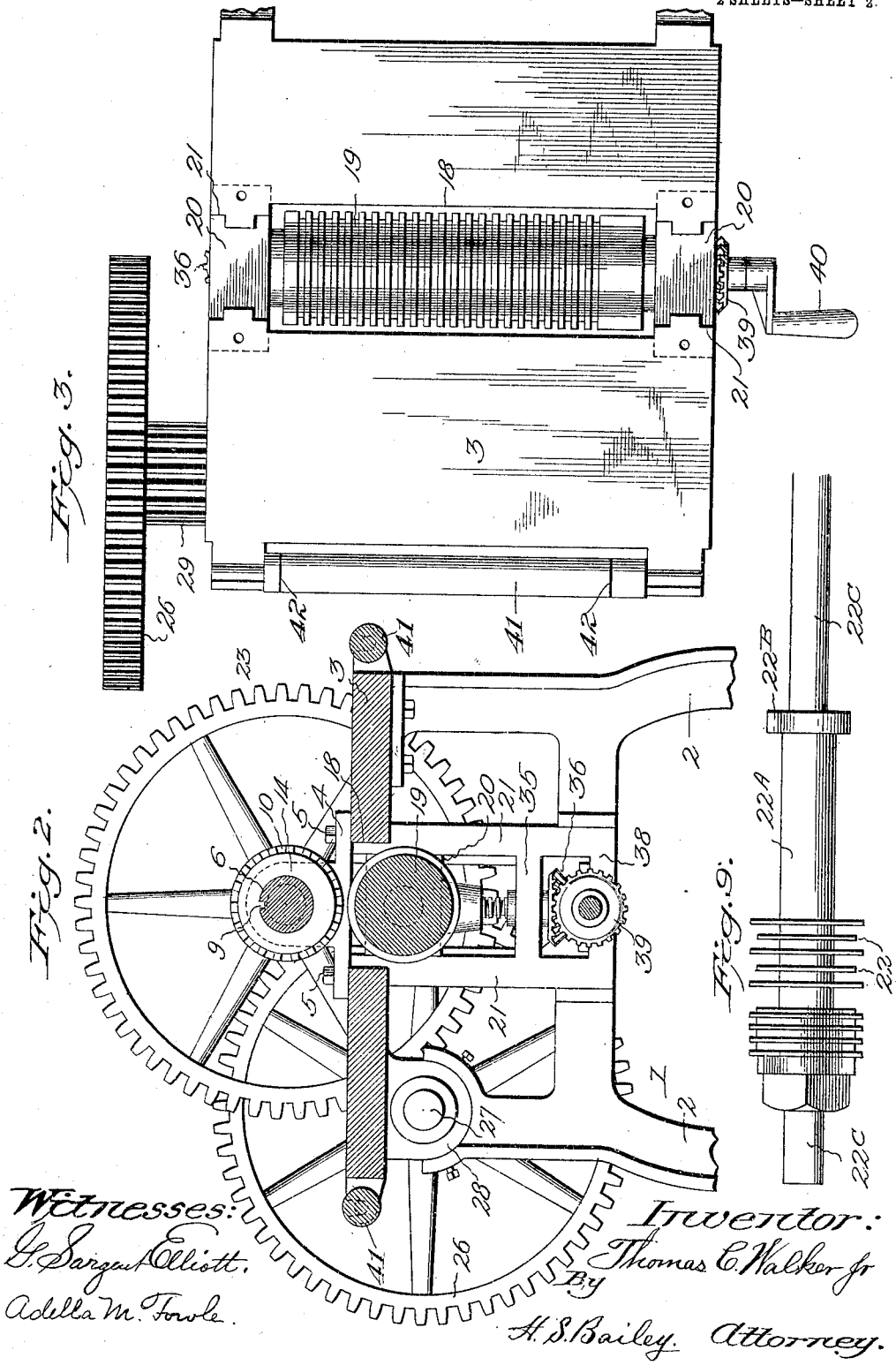

UNITED STATES PATENT OFFICE.

THOMAS C. WALKER, JR., OF DENVER, COLORADO.

ROTARY-DIE MACHINE FOR MAKING SLOTTED SCREENS.

No. 856,560.  Specification of Letters Patent.  Patented June 11, 1907.

Application filed November 14, 1906. Serial No. 343,393.

*To all whom it may concern:*

Be it known that I, THOMAS C. WALKER, Jr., a citizen of the United States of America, residing at the city and county of Denver and State of Colorado, have invented a new and useful Rotary-Die Machine for Making Slotted Screens, of which the following is a specification.

My invention relates to a new rotary die slotted screen manufacturing machine, and the objects of my invention are: first, to provide a pair of sheet metal plate slot cutting rotary die rollers, that will automatically manufacture a sheet plate of any suitable screen making metal into slotted screens. Second, to provide a pair of coöperating rotary die rollers provided with inter-meshing independent adjustable disks, having inter-meshing slot cutting teeth and tooth spaces, of any predetermined size, arrangement, or length, and of any circumferential and longitudinal predetermined arrangement, for cutting slots in sheet metal plates in any predetermined order. And third, to provide a pair of coöperating rotary die rollers provided with sheet metal slot cutting teeth arranged so that one of said die rollers can be adjustably moved in parallel axial alinement toward or away from said other die roller to permit metal sheet plates of different thickness to be fed through them and manufactured into slotted screens. I attain these objects by the mechanism illustrated in the accompanying drawings, in which:

Figure 1, is a longitudinal, vertical, sectional view, of the improved screen making machine. Fig. 2, is a transverse, vertical, sectional view of the same. Fig. 3, is a plan view of the machine, the tooth roller and boxes being removed. Fig. 4, is a view of one of the toothed disks, having a locking feather for preventing axial rotation on its shaft, said feather being in line with one of the teeth. Fig. 5, is a view of a similar disk, the locking feather of which is in line with a space between two of the teeth. Fig. 6, is a sectional view of one of the toothed disks, and one of the spacing disks. Fig. 7, is a view of a modification of the toothed disk, showing an integral spacing hub or projection. Fig. 8, is a view of a fragment of a toothed disk, showing a different style of tooth. And Fig. 9, is a side view illustrating a different manner of constructing the grooved roller.

Similar letters of reference refer to similar parts throughout the several views.

Referring to the drawings, the numeral 1, designates the supporting frame of my rotary die screen manufacturing machine. This supporting frame consists of the legs 2 and the table portion 3, to which the legs are secured in any suitable manner. Upon the opposite sides of the top surface of this table, I secure boxes 4, by cap screws 5, and in the boxes I journal a shaft 6, which is provided with a center portion between the boxes, of larger diameter than the ends of the shaft that are journaled in the boxes. A collar 7, is formed on the enlarged portion of the shaft close to one of the boxes, and at the opposite end of the enlarged central portion of the shaft a screw thread is formed, on which a nut 8, is threaded. The threaded portion of the shaft is of slightly less diameter than the main portion. In the enlarged central portion of the shaft, I cut a keyway 9, which extends from the collar 7 to the threads at its end, and upon this shaft I mount a row of thin disks 10, which have formed in their peripheral edges a circumferential row of thin wedge-shaped slot cutting teeth 11, which are arranged around the circumferential periphery of each disk at equal distances apart, and at a predetermined distance apart, which distance apart along their longitudinal alinement is governed by the distance it is desired to position the slots in the screens that are to be manufactured by the machine, it being necessary to make cutter disks with cutting teeth of different circumferential pitches, and of different lengths, so that screens may be made with short or long slots at any desired and practical material screening distances apart. These disks are provided with an axial aperture 12, in each of which a depending key 13 is formed. These cutting toothed disks are mounted on the shaft side by side, but each alternate disk is positioned so that its cutting teeth will stand between the teeth of the disk at its side, consequently the keys 13 of one-half of the disks used for any width of screen made should be positioned radially in alinement with the center of a tooth, and in the other half of the remaining disks radially in alinement with the center of a space between any two teeth, and each disk should have an even number of slot cutting teeth formed in its periphery; consequently as the disks are placed on the shaft, they are placed in alternate order, the first disk being placed on the shaft, and its depending key is inserted in the keyway of the shaft and it is pushed on the shaft against the collar 7, and the next disk that is placed on the shaft should be one with a depending key that will bring the slot cutting teeth of the disk between the teeth of the disk already on the shaft, and so the next or third disk should be one with a key that when on the shaft in the keyway will bring its teeth opposite to the teeth of the first disk, and the fourth disk should be one with its teeth opposite to the teeth of the second disk placed on the shaft, and so on in alternate order to the nut at the end of the shaft, which is screwed up tight against the disks, thus clamping them together, a washer $8^A$ being interposed between the nut and the last disk.

In order to secure the desired transverse spacing of the slot cutting teeth, to form slots of any desired transverse distance apart or mesh to correspond to any desired longitudinal distance apart of the slots or mesh, it is necessary that the centers of the slot cutting teeth of the disks be spaced at the desired distance apart transversely on the shaft, which I accomplish by placing a washer or washers 14, of sufficient thickness to separate the disks enough so the centers of the teeth of the disks will stand separated the required distance, or the opposite sides of each disk, or if desired only one side, may be provided with hub portions 15, of the required length, which may be formed integral with the disks; consequently if the disks are provided with hubs it would be necessary to construct different sets of slot cutting toothed disks for each mesh of screen it is desired to manufacture. The end of each slot cutting tooth of each disk extends from the body of the disk in diametrical lines that radiate from the center of the cutter. This form of tooth will give sufficient clearance for screen plates of ordinary thickness, but when cutters are to be provided for screen plates of more than ordinary thickness the end of each tooth is under-cut at greater converging angles 17, than the radial lines in order to give the cutting edge of the teeth greater clearance in cutting through the plates, and in moving out of the slot after it is formed, and to enable the teeth to make a clean cut slot at its ends with as little friction and expenditure of power as possible. The table 3, of the supporting frame, is provided with a slot 18, which extends through it directly underneath the slot cutting die roller, and a vertically adjustable die roller 19, which forms a disk guide roller for the slot cutting teeth of the other die roller, extends up into this slot. This disk guide is journaled in sliding boxes 20, which are supported in guideways 21, formed on the under side of the frame. This die roller 19, projects up through the slot in the table, and it may consist of a roller having formed in its surface a plurality of narrow slots, which are of the same number as the number of slot cutting toothed disks in the slot cutting toothed die roller, or it may consist of a plurality of thin independent disks separated from one another by washers 22, as shown in Fig. 9, which may be mounted on a shaft $22^A$, and be separated from one another by washers the same as the slot cutting toothed disks are, or be provided with hub portions. In case the slots are cut into the roller they are made just wide enough for the slot cutting teeth of the die roller to project and rotate in, and in case the independent disks are used, they are mounted on the shaft $22^a$, which has an enlarged central portion that is provided at one end with a collar $22^B$, at one end and with a threaded nut at its opposite end, and with two reduced journal portions $22^c$, as shown in Fig. 9, which shaft would be a duplicate of the shaft used for the slot cutting tooth disks; but in case the solid integral roller is used, it is provided with reduced journal box ends 16, which are rotatably journaled in the boxes 20. My invention contemplates either arrangement of this guide disk roller.

The shaft 6, of the die roller, projects beyond one of its boxes 4, at one side of the machine, and a gear 23 is mounted on and secured to it, and on the shaft 6 at the side of the gear 23, a pinion 24 is loosely mounted. The shaft 6, extends through and beyond the gear 23, and pinion 24, and a pulley 25 is loosely mounted on it and is either secured to a sleeve portion of the pinion or the pinion 24 may form an integral part of the hub of the pulley, as illustrated in Fig. 1. The pinion 24, meshes with a gear 26, mounted on a stub shaft 27, journaled in a bearing 28 adjacent to one corner of the table. A pinion 29, is also secured upon the stub shaft 27, which engages the gear 23. Thus when the pulley revolves, the pinion 24 engages the gear 26, which also turns the pinion 29, and this pinion engages the gear wheel 23, and turns the shaft 6, which is slowly rotated. An oil distributing pipe or receptacle 30 is placed above the die roller and is provided with a row of oil distributing apertures in its lower side that are adapted to allow oil to drip onto each toothed slot cutting disk of the die roller. The oil discharging pipe is connected by a valve-controlled pipe 31 to any suitable oil can 32, which is provided with a supply of any suitable oil for the slot cutting teeth. The oil can is supported above the die roller by any suitable means, but preferably by standards 33, which are secured to the top of the boxes 4. The guide roller is vertically adjustable relative to the die roller, and this vertical adjustment of this guide roller may be effected by manually operating threaded rods 34, which are rotatably secured to the vertically sliding boxes 20, and are rotatably secured in a connecting strip 35, of the slideways, but in carrying out this feature of my invention I prefer to provide a mechanism by which the guide roller may be raised and lowered vertically throughout its length parallel with the axis of the die roller. I accomplish this object by attaching to the lower ends of these threaded rods bevel gears 36, and below these bevel gears I mount a shaft 37, in axial alinement with the die roller, in brackets 38, which are formed at the lower ends of the guideway of the boxes, and on this shaft I secure two bevel gears 39, in position to mesh with the bevel gears on the ends of the threaded rods, and at one end of the shaft I secure a crank handle 40, by which the shaft and gears may be rotated, which rotative movement imparts rotative movement to the gears of the threaded rods, and to the threaded rods, and raises or lowers the boxes, and consequently the guide roller, in axial parallel alinement with the die roller.

The operation is as follows: The die and guide rollers are both rotated through the medium of the pulley and the gears, and in operation the machine screens are made out of sheets or plates of iron, steel, brass, copper, or other suitable metals or metal alloys, and these sheets of metal are fed between the rollers, being guided therein by an operator who lays them on the table, and a supporting roller 41, which is supported by brackets extending from the feed end of the table, a similar roller and bracket being provided at the opposite or discharge end of the table, and on the plate feeding supporting roller a line 42, is formed, at each end of the roller, to indicate a transverse line from the ends of the die roller to the supporting roller at right angles to the longitudial axis of the die roller, and these lines are preferably positioned on the supporting roller to indicate the length of the die roller and the position of its ends slot-cutting disks, so that an operator can set the edge of the sheet on the line of the plate supporting roller at the same time he places the same edge of the sheet at the end of die roller, and will thus be able to feed the sheets of metal squarely into the die and guide rollers, and as the die roller rotates its slot cutting teeth sink into and through the metal plate and they feed the plate through the rollers, and as they sink into the plate their wedge-shaped cutting edges cut like a knife through the sheet metal and form clear cut slots of the length and thickness of the teeth, which slots are of the same size throughout their length. I mention this feature as when screens are punched by reciprocating punches, the metal between the slots is swaged to one side of the punch and closes the ends of the adjacent slot, and thus makes screens with slots of varying area, that is, slots that are wider at their middle portions than at their ends. The reason why the disk teeth cut a clean slot of even size throughout their length is because they enter the plate with a shearing contact, as their sharp heel corner first contacts with the plate, as the disk rotates and pierces it, and the balance of their sharp wedge-shaped edge cuts a clean cut fine slot through the plate as the teeth rotate, and as the teeth rotate past their lower center their cutting edges extend clean through the sheet of metal, and being wedge-shaped they spread the slot open evenly throughout the length of the slot, and the clearance of the radial ends of each tooth is made sufficient so that they clear the ends of the slots, as the disks in rotating lift the teeth out of the slots they cut in the plates. The circumferential die slots in the guide roller support the slot cutting teeth, and at the same time the peripheral surface of this roller holds the plate sheets of metal up against the die roller at the desired position to cut slot through the sheets of metal of the desired width, and this guide roller can be raised or lowered so the slots of different width may be made with the same die roller, as the slot-cutting teeth are wedge-shaped, and are brought to so fine an edge that when the guide roller is set so that they will just pass through a sheet they will make a screen of from eighty or ninety or a hundred mesh in size, which means a slot of that width, but if the guide roller is raised so that the teeth bury themselves through the plates, their whole depth, a screen would be made having slots of the same length but of about twenty or twenty-five mesh in width; consequently one die roller will cut different meshes of screens, varying from about twenty to about one hundred fine, by adjustably setting the guide roller to and from the die roller. The capacity of my roller die screen manufacturing machine, is enormous, as it will automatically feed the longest sheet metal plates made of all widths, very fast through it. All that is required of an attendant is to start the sheets of metal squarely into the die rollers, and as the teeth are continuously lubricated they require but little power to cut through the sheets of metal, and they easily cut the slots in the metal, and they can be easily sharpened from time to time by inserting the disks in an emery grinding machine.

While I have illustrated and described my roller die slotted screen manufacturing machine, I do not wish to be limited to the construction and arrangement shown and described, as my invention contemplates broadly a pair of coöperative rotary dies for manufacturing slotted screens of any mesh.

Having described my invention, what I claim as new and desire to secure by Letters Patent, is:

In a slotted screen manufacturing machine, the combination of the supporting frame, with a pair of rotary and coöperating slot cutting die rollers mounted and journaled on said frame in vertical alinement to automatically feed sheet metal plates between and through them, gears arranged to rotate one of said rollers, a pulley arranged to drive said gears and roller, sliding boxes arranged to support one of said die rollers, guide ways in which said sliding boxes are seated, threaded rods arranged to raise or lower said sliding boxes and roller to or from said other die roller, means including gearing for rotating said threaded rods to raise or lower the opposite ends of said die roller simultaneously and in parallel alinement with said other die roller, and a plurality of independent and removable wedge-shaped toothed disks arranged to taper equally from the sides of said disk to a short centrally positioned cutting edge, a clearance space in the flanks of each tooth of each disk, said slot cutting teeth being arranged in any predetermined order and distance apart, both circumferentially and longitudinally of said roller's axis, a table on said supporting frame arranged in a horizontal plane tangent to the peripheries of said coöperating rollers when in operative slot-cutting relation, a sheet metal supporting roller at the opposite ends of said table, and a guide line on said rollers and table arranged and adapted to squarely start each sheet metal plate into said die rollers.

In testimony whereof I affix my signature in presence of two witnesses.

THOMAS C. WALKER, Jr.

Witnesses:
G. SARGENT ELLIOTT,
ADELLA M. FOWLE.